(12) United States Patent
Lavignotte et al.

(10) Patent No.: US 9,677,425 B2
(45) Date of Patent: Jun. 13, 2017

(54) AXISYMMETRICAL INTERMEDIATE CASE PART INCLUDING AN INSERT POSITIONED IN AN ANNULAR GROOVE

(71) Applicant: SNECMA, Paris (FR)

(72) Inventors: Richard Lavignotte, Lasclaveries (FR); Patrick Jean-Louis Reghezza, Vaux le Penil (FR)

(73) Assignee: SNECMA, Paris (FR)

( * ) Notice: Subject to any disclaimer, the term of this patent is extended or adjusted under 35 U.S.C. 154(b) by 1181 days.

(21) Appl. No.: 13/951,681

(22) Filed: Jul. 26, 2013

(65) Prior Publication Data
US 2014/0294573 A1  Oct. 2, 2014

(30) Foreign Application Priority Data
Aug. 2, 2012 (FR) ...................... 12 57539

(51) Int. Cl.
*F01D 25/24* (2006.01)
*F02K 1/70* (2006.01)
*F02K 3/06* (2006.01)

(52) U.S. Cl.
CPC ............. *F01D 25/24* (2013.01); *F02K 1/70* (2013.01); *F02K 3/06* (2013.01); *F05D 2260/36* (2013.01); *Y10T 29/4932* (2015.01)

(58) Field of Classification Search
CPC . F01D 25/24; F01D 5/14; F01D 25/26; F01D 25/28; F02C 7/20; F02K 1/70; F02K 3/06; F05D 2260/36; F03B 11/00; F03B 11/04; F04D 29/60
USPC ........... 415/201, 210.1, 213.1; 277/395, 481, 277/491, 530, 647
See application file for complete search history.

(56) References Cited

U.S. PATENT DOCUMENTS

| | | | | |
|---|---|---|---|---|
| 1,909,353 A | * | 5/1933 | Hughes | A47H 19/00 403/326 |
| 3,076,634 A | * | 2/1963 | Boyle | F01D 5/323 416/221 |
| 3,323,807 A | * | 6/1967 | Vanderbilt, Jr. | F16J 9/066 277/481 |
| 3,601,415 A | * | 8/1971 | Bond | F16J 9/06 277/481 |
| 4,746,129 A | * | 5/1988 | Puccio | E01D 19/06 277/641 |

(Continued)

FOREIGN PATENT DOCUMENTS

EP 2 442 032 A1 4/2012
FR 2 925 120 6/2009

OTHER PUBLICATIONS

French Preliminary Search Report Issued Apr. 23, 2013 in French 12 57539, filed on Aug. 2, 2012 ( with English Translation of Category of Cited Documents).

*Primary Examiner* — Ninh H Nguyen
*Assistant Examiner* — Aaron R Eastman
(74) *Attorney, Agent, or Firm* — Oblon, McClelland, Maier & Neustadt, L.L.P.

(57) ABSTRACT

An axisymmetrical portion for an aircraft turbojet engine intermediate case intended to protrude downstream from an outer axisymmetrical portion of the intermediate case is provided. The axisymmetrical portion includes an annular groove radially open outwards, and at least one insert laid out inside the groove, which covers each internal face of the groove and which is radially open outwards.

8 Claims, 4 Drawing Sheets

(56) References Cited

U.S. PATENT DOCUMENTS

| | | | | |
|---|---|---|---|---|
| 5,749,218 | A * | 5/1998 | Cromer | B23P 6/002 60/39.37 |
| 8,105,016 | B2 * | 1/2012 | Butz | F01D 5/22 415/119 |
| 9,212,564 | B2 * | 12/2015 | Langlois | F01D 9/04 |
| 2002/0044870 | A1 * | 4/2002 | Simonetti | F01D 5/28 416/221 |
| 2007/0036644 | A1 * | 2/2007 | Harper | F01D 11/127 415/173.1 |
| 2007/0134088 | A1 * | 6/2007 | Lee | F01D 9/00 415/209.2 |
| 2008/0053107 | A1 * | 3/2008 | Weaver | F01D 9/023 60/800 |
| 2008/0199320 | A1 * | 8/2008 | Matheny | F01D 5/147 416/220 R |
| 2009/0155070 | A1 * | 6/2009 | Duchatelle | B64D 27/26 415/213.1 |
| 2011/0081228 | A1 * | 4/2011 | Durocher | F01D 5/18 415/115 |
| 2012/0076659 | A1 * | 3/2012 | Robertson | B01D 46/02 416/219 R |
| 2014/0234117 | A1 * | 8/2014 | Cairo | C04B 35/117 416/241 R |

* cited by examiner

AXISYMMETRICAL INTERMEDIATE CASE PART INCLUDING AN INSERT POSITIONED IN AN ANNULAR GROOVE

TECHNICAL FIELD

The invention relates to an axisymmetrical portion of an intermediate case for an aircraft turbojet engine including an annular groove and means allowing compensation for the wear of the groove gradually as the turbojet engine is used.

STATE OF THE PRIOR ART

An axisymmetrical portion of an intermediate case is intended to produce the interface between the intermediate case of the turbojet engine and the thrust reverser cowls of the nacelle.

An exemplary axisymmetrical portion of an intermediate case is for example described in document FR-A-2 925 120.

The axisymmetrical case portion includes an annular groove which is intended to receive a complementary annular lip belonging to the thrust reverser cowl. The lip radially and/or axially bears against the internal faces of the groove.

During operation of the turbojet engine, the direction and the amplitude of the supporting forces vary according to the operating conditions of the turbojet engine.

Thus, for example, when the turbojet engine is at a standstill, the axisymmetrical case portion supports the thrust reverser cowl; the lip therefore radially bears downwards against the bottom of the groove.

On the other hand, during thrust reversal, the lip axially bears in one direction against the wall of the groove and radially against the bottom of the groove.

Also, the turbojet engine produces vibrations which result in a relative displacement between the lip and the groove.

All these stresses and vibrations generate wear of the walls of the groove. This wear is irregularly distributed over the periphery of the groove.

When this wear becomes greater than a predefined limit, which is of the order of a few tenths of a millimeter, the groove has to be repaired. For lack of an existing repair technique, the axisymmetrical portion is generally stored, it is then stated that it is "put on shelf". Otherwise, the worn portions of the groove are sanded; this is then referred to as "belt finishing of the axisymmetrical portion".

The object of the invention is to propose an intermediate case axisymmetrical portion for an aircraft turbojet engine for which the repairs on the rib may be applied "on site", i.e. without requiring any disassembling of the axisymmetrical portion at each intervention.

DISCUSSION OF THE INVENTION

The invention proposes an axisymmetrical portion for an aircraft turbojet engine intermediate case which extends downstream from said intermediate case, the axisymmetrical portion including an annular groove radially open outwards, characterized in that it includes at least one insert laid out inside the groove, which covers each internal face of the groove and which is radially open outwards.

By adding an insert for covering the faces of the groove, it is possible to easily repair the wear of the groove after a period of use of the turbojet engine.

Further, the insert can itself be easily disassembled, which facilitates its replacement in the case of wear.

Preferably, the axisymmetrical portion includes several circumferentially aligned annular sectors, in which the groove is formed, and includes an insert associated with each of the annular sectors, which forms a segment of a ring with a length substantially equal to the circumferential length of the associated annular sector.

Preferably, the insert and the axisymmetrical portion include complementary means for holding the insert in position in the groove.

Preferably, the insert includes at least one rib which is received in a complementary throat of the groove.

Preferably, said at least one rib substantially protrudes outwards relatively to a wing and/or a bottom wall associated with the insert, which is in contact with a face facing the groove, and said complementary throat is made in the associated face of the groove.

Preferably, each end of the insert bears a tab which is capable of abutting against an end face of the associated annular sector.

Preferably, the insert is adhesively bonded inside the groove.

The invention also proposes an insert intended to be mounted in the groove of an axisymmetrical portion according to the invention, characterized in that the insert includes two wings with a radial main orientation, positioned on either side of a middle radial plane of the insert, which are connected together through a bottom wall and in that it includes means for holding it in position in the groove.

Preferably, at least one wing and/or the bottom wall bears at least one rib protruding outwards.

Preferably, each wing bears a rib and the ribs are positioned at radial heights different from each other.

Preferably, the bottom wall includes at least one rib which protrudes radially inwards relatively to a bottom wall of the insert.

Preferably, the rib forms a tenon, the width of which increases upon moving away from the bottom wall.

Preferably, the insert includes stopping means in displacement along the groove.

Preferably, the insert is able to elastically deform in order to allow it to be radially introduced into the groove.

The invention also proposes a method for setting into place an insert according to the invention, on an axisymmetrical portion of an aircraft turbojet engine intermediate case according to the invention, the axisymmetrical portion including an annular groove radially open outwards, characterized in that it includes a step for machining the walls of the groove and a step for introducing the insert into the machined groove.

Preferably, the machining step consists of machining all the walls of the groove so that the shape of the groove at the end of the machining step matches the shape of the insert.

Preferably, the machining step includes a phase for machining a throat in at least one face of the groove.

Preferably, the step for inserting the insert consists of introducing the insert into the groove according to a circumferential sliding movement relatively to the main axis of the axisymmetrical portion.

Preferably, the step for inserting the insert consists of introducing the insert into the groove according to a radial movement relatively to the main axis of the axisymmetrical portion.

Preferably, the insertion step includes a phase for elastic deformation of the insert, a phase for introducing the insert into the groove and then a phase for the insert to elastically return to its shape.

Preferably, the method includes a step for laying a bead of adhesive onto the groove, prior to the step for inserting the insert.

SHORT DESCRIPTION OF THE DRAWINGS

Other characteristics and advantages of the invention will become apparent upon reading the detailed description which follows for the understanding of which reference will be made to the appended figures wherein.

DETAILED DISCUSSION OF PARTICULAR EMBODIMENTS

Figure 1:
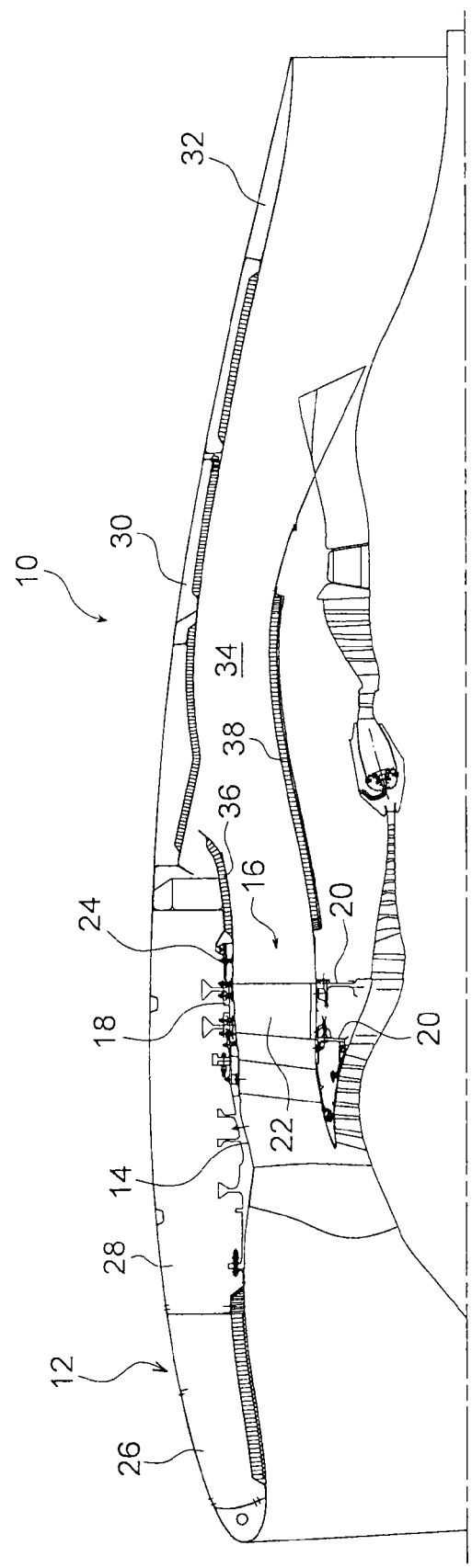
FIG. 1 is a schematic illustration in a partial axial section of an aircraft turbojet engine.

An aircraft turbojet engine 10 including a nacelle 12, a fan case 14 extended rearwards with an intermediate case 16 are illustrated in FIG. 1.

The intermediate case 16 comprises an outer ferrule 18 located in the aerodynamic rear extension of the fan case 14, of the transverse flanges 20 interiorly positioned radially relative to this outer ferrule 18. The intermediate case 16 further comprises angularly distributed structural arms 22 and extending radially between the flanges 20, as far as the outer ferrule 18 which they contact.

The outer ferrule 18 of the intermediate case 16 includes, in its downstream portion, an axisymmetrical portion 24, the main purpose of which is to establish a connection between the outer ferrule 18 and the downstream directly adjacent nacelle cowls.

The nacelle 12 forms a continuous aerodynamic outer surface, formed with an air intake 26, fan cowls 28, thrust reverser cowls 30, and a fixed rear cowling 32, these elements being laid out adjacent from the front to the rear.

The thrust reverser cowls 30, generally two in number and articulated on the rigid structure of the pylon, delimit in a known way an annular secondary flow channel 34, by means of the external 36 and internal 38 annular skins.

Figure 2:
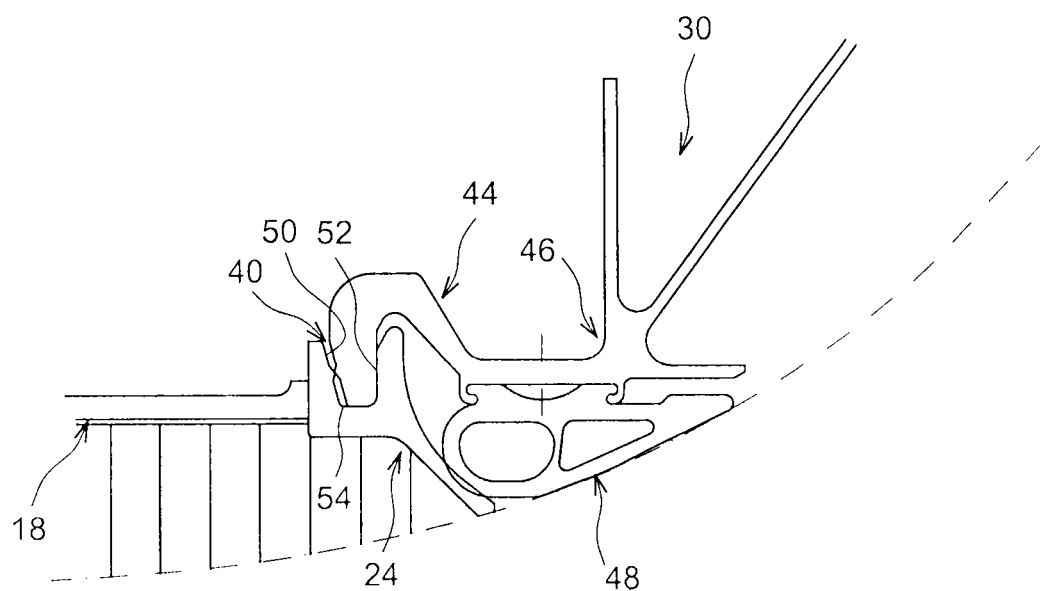
FIG. 2 is a detail at a larger scale of the turbojet engine illustrated in FIG. 1, showing the connection between the axisymmetrical case portion and the thrust reverser cowls.

As this may be seen in more detail in FIG. 2, the connection between the axisymmetrical portion 24 of the case and the thrust reverser cowls 30 in achieved via an annular groove 40 made in the axisymmetrical portion 24 and an annular lip 44 which is mounted on a bearing structure 46 of the cowl 30, which is received into the groove 40.

This cooperation of the annular lip 44 with the groove 40 allows the reverser cowls 30 to be maintained axially and radially on the nacelle 12.

An annular gasket 48 is laid out between the groove 40 and the lip 44 in order to prevent any airflow at the junction between the axisymmetrical portion 24 and the bearing structure 46.

The axial section of the groove 40 is globally U-shaped, the groove 40 thus includes a front axisymmetrical face 50, a rear axisymmetrical face 52 facing the front face 50 and a cylindrical bottom face 54 connecting the front and rear faces 50, 52 to their internal radial ends.

The annular lip 44 is received into the groove 40 and bears axially and/or radially against the faces 50, 52, 54 of the groove 40.

During operation of the turbojet engine 10, the vibrations caused by the moving portions cause movement of the lip 44 in the groove 40 and therefore gradual wear of the faces 50, 52, 54 of the groove 40.

In order to limit the general weight of the turbojet engine, the axisymmetrical portion 24 is made in a material based on aluminum which wears out rapidly.

If the wear of the faces 50, 52, 54 of the groove 40 is too pronounced, significant play is formed between the lip 44 and the groove 40.

Figure 3:
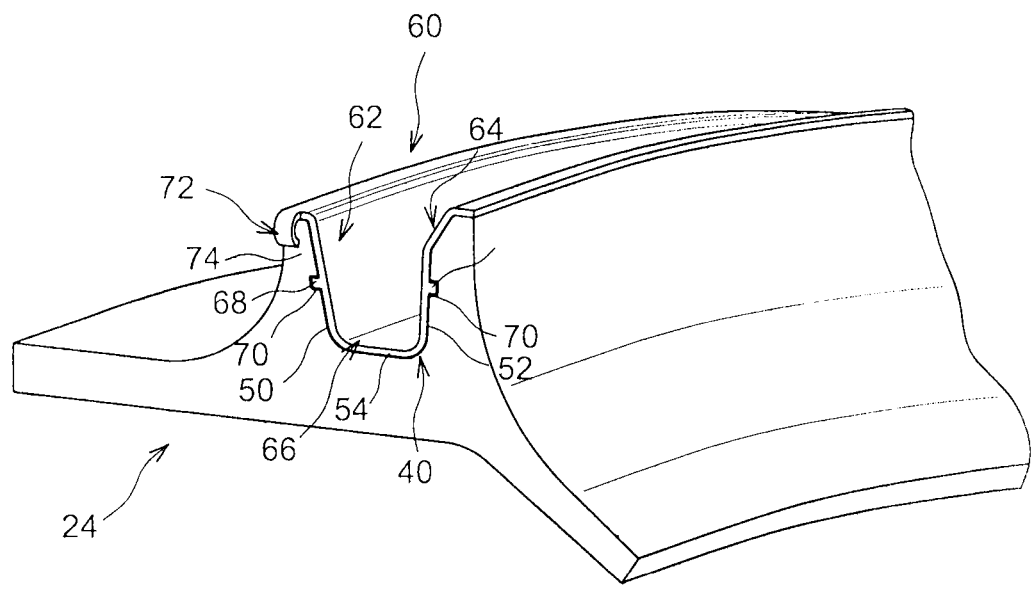
FIG. 3 is a perspective schematic illustration of an axisymmetrical case portion including an insert according to the invention.

In order to limit the wear of the faces 50, 52, 54 of the groove 40, or to compensate for this wear, as this may be seen in FIG. 3, the case axisymmetrical portion 24 includes at least one insert 60 which is positioned in the groove 40 and which covers the faces 50, 52, 54 of the latter.

Each insert 60 is made in a material which is more resistant to wear than the constitutive material of the axisymmetrical portion 24. For example, the insert 60 is made in a material designated under the INCONEL brand, which is based on chromium and nickel.

Such a material allows the use of a small amount of material, while being more resistant than the material of the axisymmetrical portion 24. The thickness of the inserts 60 is thus relatively small, it is for example of less than 1 millimeter, preferably, the thickness of the insert is 0.7 millimeters.

The outer shape or the insert 60 matches the shape of the groove 40 and the interior shape of the insert 60 matches the shape of the annular lip 44, which is received into the groove 40, in order to limit plays between the bearing structure 46 and the axisymmetrical portion 24.

The insert 60 thus includes two front and back wings 62, 64 respectively which are placed side by side axially against the front face 50 or the rear face 52 of the groove 40, and also includes a bottom wall 66 which is placed adjacent to the bottom face 54 of the groove 40 and against it.

The shape of the front face 50 and that of the rear face 52 of the groove 40 are different, i.e. the groove 40 is not symmetrical relatively to a middle radial plane of the groove 40. Therefore, both wings 62, 64 of the insert 60 each have the same shape as the front and rear faces 50, 52 of the groove 40. This further gives the possibility of preventing misconnection upon mounting the insert 60 into the groove 40.

The insert 60 includes means for maintaining it in position in the groove 40, which cooperate with the axisymmetrical portion 24.

The insert 60 includes means for maintaining it in position, radially in the groove 40, which consist in at least one rib 68 which is received into a complementary throat 70 of the groove 40.

Figure 4:
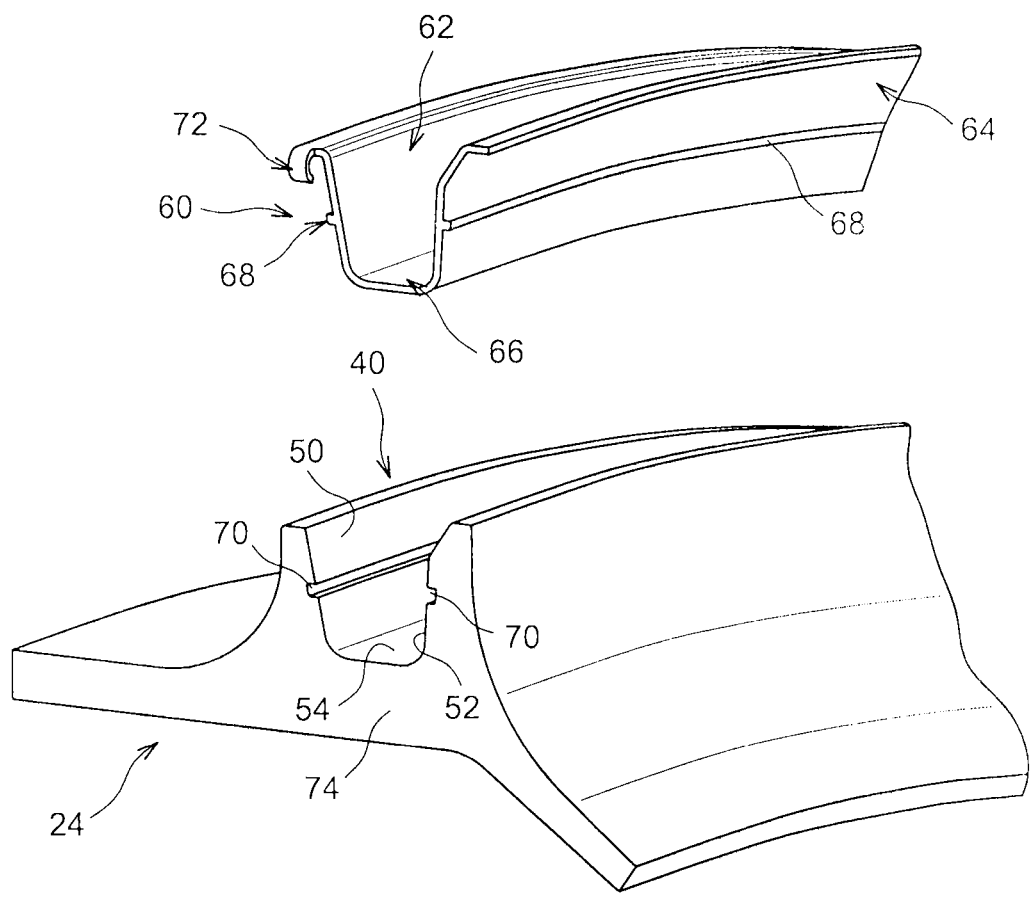
FIG. 4 is an exploded view of the axisymmetrical case portion illustrated in FIG. 3.

According to the embodiment illustrated in FIGS. 3 and 4, the insert 60 includes two ribs 68, each of which is borne by a wing 62, 64. Each rib 68 protrudes axially outwards relatively to an end face of the associated wing 62, 64 and it is received into a complementary throat made in the front face 50 or in the rear face 52 of the groove 40.

According to the embodiment illustrated in FIG. 3, both ribs 68 are located on a same radial side relatively to the main axis of the axisymmetrical portion 24.

According to an alternative embodiment (not shown), both ribs 68 are located on different radial sides relatively to each other. This gives the possibility of preventing the insert 60 from being mounted upside down in the groove 40, since the ribs 68 cannot be properly introduced into the throat 70.

Figure 5:
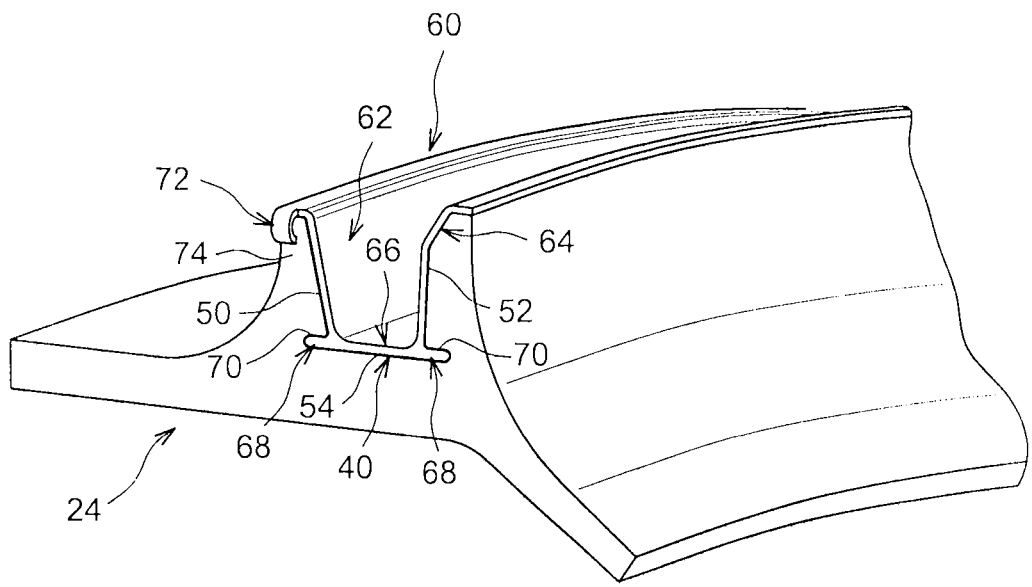
FIG. 5 is a view similar to the one of FIG. 3 showing another embodiment of the invention.
Figure 6:
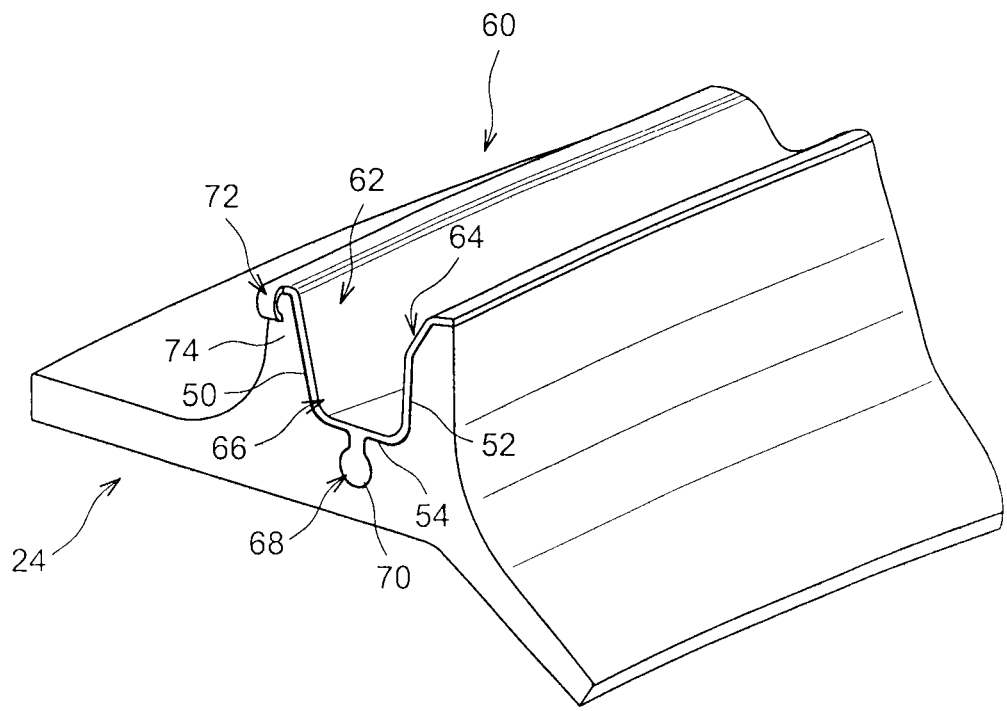
FIG. 6 is a view similar to that of FIG. 3 further showing another embodiment of the invention.

According to another embodiment illustrated in FIGS. 5 and 6, said at least one rib is located at the bottom wall 66 of the insert 60.

According to the embodiment illustrated in FIG. 5, the bottom wall 66 is axially extended forwards and rearwards with two ribs 68, which are received into complementary throats made in the axisymmetrical portion 24.

According to the embodiment illustrated in FIG. 6, the bottom wall 66 includes a single rib 68 which extends radially inwards from a radially internal face of the bottom wall 66.

This single rib 68 forms a tenon, i.e. its axial width increases upon radially moving away from the bottom wall 66, over at least one portion of the radial length of the rib 68. This shape of the rib allows it to bear radially outwards against a portion of the associated throat 70, thus achieving radial blocking of the insert 60 in the groove 40.

The axisymmetrical portion 24 includes several annular sectors (not shown), in which the groove 40 is made. The groove 40 is thus formed with several portions or annular sectors, circumferentially distributed regularly around the main axis of the turbojet engine.

As a non-limiting example, the axisymmetrical portion 24 includes four annular sectors delimiting an angular sector of less than 90°.

The axisymmetrical portion 24 receives several inserts 60, each of which form a segment of a ring associated with a portion of the groove 40, and for which the circumferential length of each insert 60 is substantially equal to the circumferential length of the associated annular sector.

Each insert 60 also includes means for stopping the insert 60 upon displacement along the groove 40, i.e. stopping means upon circumferential sliding.

These stopping means consist in tabs 72 located at each circumferential end of the insert 60, and each of these tabs 72 is capable of bearing against an associated circumferential end face 74 associated with the annular sector associated with the insert 60. These tabs 72 are preferably elastically deformable, in order to facilitate the setting into place of the insert 60 in the groove 40 and for ensuring good support of the tabs on the associated circumferential end face 74.

As this was stated earlier, when the turbojet engine is operating, vibrations occur. These vibrations may damage the axisymmetrical portion 24. This is why the insert 60 is bound to the groove by adhesive bonding, i.e. a film of adhesive (not shown) is placed between the insert 60 and the groove 40. The adhesive film forms an element damping the vibrations.

The insertion of the insert 60 into the groove 40 may be carried out either according to radial inward movement or according to circumferential sliding in the length of the groove 40.

The radial insertion of the insert 60 into the groove 40 is possible for the embodiment illustrated in FIGS. 3 and 4, for which the ribs are borne by the wings 62, 64 of the insert 60.

In order to allow introduction of the insert into the groove 40 by a radial displacement, the insert 60 is elastically deformed by bringing both wings 62, 64 closer to each other, so that the ribs 68 do not radially abut against the axisymmetrical portion 24.

This elastic deformation of the insert 60 is made possible by the material used for forming the insert 60, and also by the small thickness of the insert 60.

When the wings 62, 64 of the insert 60 are sufficiently close to each other, the insert 60 is temporarily maintained in this configuration and is then introduced into the groove 40 by a radial movement until the bottom wall 66 bears against the bottom face 54 of the groove 40.

Next, the insert 60 is no longer maintained in its configuration in which the wings 62, 64 are brought closer to each other, they then return into their initial configuration elastically.

During the elastic return of the wings 62, 64, the ribs 68 are introduced into the associated throats 70 automatically.

Finally, the insert 60 is set in a circumferential position, and maintained in this position via the tabs 72 which are permanently deformed so as to bear against the circumferential end faces 74 associated with the associated annular sector.

The insertion of the inserts 60 into the groove 40 according to circumferential sliding is carried out by gradually introducing the insert 60 in the groove 40 through one of its circumferential ends.

This insertion method is relatively simple to apply and it applied for all the embodiments of the insert 60. However, this insertion method requires significant forces for pushing the insert 60 into the groove 40.

When the insert 60 is circumferentially in place, the tabs 72 are deformed permanently so as to bear against the associated circumferential end faces 74.

According to the invention, the axisymmetrical portion 24 is provided for receiving an insert 60 either from the start, during its manufacturing, or after use, during a maintenance operation.

When the axisymmetrical portion 24 is provided from the start for receiving an insert 60, the groove 40 is made with a shape and dimensions mating those of the insert 60. During a maintenance operation, for replacing a worn insert 60 with a new insert 60, the steps for replacement of the insert 60 consist of removing the worn insert 60, of depositing an adhesive film of the faces of the groove 40 and then introducing the new insert 60.

The extraction of the worn insert 60 is carried out in the opposite way upon introducing an insert 60 into the groove 40, i.e. by elastically deforming the insert 60 in order to bring its wings 62, closer to each other when the insert may be introduced/extracted according to a radial movement, or else by circumferentially sliding the insert 60 into the grooves 40 in order to extract it.

When the axisymmetrical portion 24 is not provided from the start for receiving an insert 60, this means that the dimensions of the groove 40 do not allow the insert 60 to be received.

For this purpose, the method for installing an insert 60 on the axisymmetrical portion 24 includes a step for machining the axisymmetrical portion 24, for enlarging the dimensions of the groove 40 and for forming the throats 70 receiving the ribs 68.

The axisymmetrical portion 24 is then similar to an axisymmetrical portion which is provided from the start for receiving an insert 60. The introduction or the extraction of an insert 60 from such an axisymmetrical portion 24 is thus similar to the introduction/extraction method described earlier.

Thus, the use of an insert 60 as described earlier may be achieved at an OEM level, i.e. as soon as the first use, or else at an aftermarket level, i.e. after intervention on the axisymmetrical portion 24.

The invention claimed is:

1. An axisymmetrical portion for an aircraft turbojet engine intermediate case which extends downstream from said intermediate case, the axisymmetrical portion comprising:
    an annular groove radially open outwards, the groove including an axisymmetric front face, an axisymmetric rear face facing the front face, and a cylindrical bottom face connecting the front and rear faces at internal radial ends thereof; and
    an insert laid out inside the groove, the insert including a front wing, a back wing, and a bottom wall connecting the front and back wings, which respectively abut and cover the front face, the rear face, and the bottom face of the groove, and the insert is radially open outwards,
    wherein an outer shape of the insert matches a shape of the groove,
    wherein a shape of the front face and a shape of the rear face are different from each other such that the groove is not symmetric relative to a middle radial plane of the groove,
    wherein at least one of the front face, the rear face, and the bottom wall of the insert includes a rib which is received in a complementary throat provided in the axisymmetric portion, and
    wherein a material of the insert is more wear resistant than a material of the axisymmetrical portion including the groove.

2. The axisymmetrical portion according to claim 1, comprising:
    several circumferentially aligned annular sectors, in which the groove is formed, and
    a plurality of the inserts, each of the inserts associated with each of the annular sectors, which forms a segment of a ring with a length substantially equal to the circumferential length of the associated annular sector.

3. The axisymmetrical portion according to claim 2, wherein each circumferential end of each of the inserts bears a tab which is capable of abutting against circumferential end face of the associated annular sector.

4. The axisymmetrical portion according to claim 1, wherein the insert is adhesively bonded inside the groove.

5. A method for setting into place the insert on an axisymmetrical portion of an aircraft turbojet engine intermediate case according to claim 1, the axisymmetrical portion including an annular groove radially open outwards,
    said method comprising a step for machining the faces of the groove and a step for introducing the insert into the machined groove.

6. The method according to claim 5, wherein the machining step includes machining all the faces of the groove so that the shape of the groove at the end of the machining step matches the shape of the insert.

7. The axisymmetrical portion according to claim 1, wherein the bottom wall is axially extended forwards and rearwards with two ribs which are received into complementary throats provided in the axisymmetric portion.

8. The axisymmetrical portion according to claim 1, wherein the rib extends radially inwards from a radially internal face of the bottom wall which is received into the complementary throat provided in the bottom face of the groove.

* * * * *